United States Patent
Adapa et al.

(10) Patent No.: US 12,284,530 B2
(45) Date of Patent: Apr. 22, 2025

(54) WI-FI DEPLOYMENT OVER LARGE AREAS USING BACKHAUL LINKS

(71) Applicant: NETGEAR, Inc., San Jose, CA (US)

(72) Inventors: Sreekar Adapa, Richmond, CA (US); Bryan Christopher Herrera, San Jose, CA (US); Joseph Amalan Arul Emmanuel, San Jose, CA (US)

(73) Assignee: NETGEAR, INC., San Jose, CA (US)

( * ) Notice: Subject to any disclaimer, the term of this patent is extended or adjusted under 35 U.S.C. 154(b) by 408 days.

(21) Appl. No.: 17/812,423

(22) Filed: Jul. 13, 2022

(65) Prior Publication Data

US 2024/0022915 A1    Jan. 18, 2024

(51) Int. Cl.
| | |
|---|---|
| *H04W 16/18* | (2009.01) |
| *H04L 12/10* | (2006.01) |
| *H04W 16/24* | (2009.01) |
| *H04W 88/08* | (2009.01) |

(52) U.S. Cl.
CPC .............. *H04W 16/18* (2013.01); *H04L 12/10* (2013.01); *H04W 16/24* (2013.01); *H04W 88/08* (2013.01)

(58) Field of Classification Search
CPC ............ H04L 12/10; H04W 16/18–20; H04W 16/24–26; H04W 16/32; H04W 84/00–047; H04W 84/10–22; H04W 88/08–14
See application file for complete search history.

(56) References Cited

U.S. PATENT DOCUMENTS

| | | |
|---|---|---|
| 6,480,510 B1 | 11/2002 | Binder |
| 6,665,718 B1 * | 12/2003 | Chuah ................... H04L 69/164 709/227 |
| 6,771,932 B2 | 8/2004 | Caminiti et al. |
| 7,508,834 B2 | 3/2009 | Berkman et al. |
| 9,491,764 B1 | 11/2016 | Ross et al. |
| 9,686,695 B2 | 6/2017 | Subramanian et al. |
| 10,159,035 B2 | 12/2018 | Islam et al. |
| 10,547,372 B2 | 1/2020 | Rappaport et al. |
| 10,560,150 B2 | 2/2020 | Henry et al. |
| 11,115,111 B1 | 9/2021 | Bakr et al. |
| 2004/0198453 A1 | 10/2004 | Cutrer et al. |

(Continued)

FOREIGN PATENT DOCUMENTS

| | | |
|---|---|---|
| EP | 2830382 B1 | 3/2016 |
| EP | 2848083 B1 | 9/2017 |
| JP | 2017539149 A | 12/2017 |

*Primary Examiner* — Ronald Eisner
(74) *Attorney, Agent, or Firm* — PERKINS COIE LLPL (57) ABSTRACT

Apparatuses and systems for deploying wireless connectivity across a geographical area are disclosed. A bollard for deploying the wireless connectivity includes a modem and a router to receive an Internet connection from an ISP uplink. A PoE switch receives the Internet connection from the router. A first set of wireless backhaul bridges receive the Internet connection from the PoE switch and provide the Internet connection to a second set of wireless backhaul bridges embedded within a set of bollards external to the bollard. A wireless AP receives the Internet connection from the PoE switch. The AP includes a first Wi-Fi router to provide the wireless connectivity, using the Internet connection, to a first set of client devices, and a second Wi-Fi router to provide the wireless connectivity, using the Internet connection, to a second set of client devices.

20 Claims, 5 Drawing Sheets

(56) References Cited

U.S. PATENT DOCUMENTS

| | | |
|---|---|---|
| 2009/0203310 A1 | 8/2009 | Lozano et al. |
| 2017/0181151 A1 | 6/2017 | Ross et al. |
| 2017/0272491 A1 | 9/2017 | Ortiz et al. |

\* cited by examiner

WI-FI DEPLOYMENT OVER LARGE AREAS USING BACKHAUL LINKS

TECHNICAL FIELD

The present disclosure is generally related to deploying wireless connectivity over a geographical area.

BACKGROUND

Internet speeds and Wi-Fi have improved recently. However, wireless networks deployed over a geographical area can slow down when client devices are too far from the router. The further a client device is from the router, the more unreliable the connection and its throughput. Moreover, a lack of bandwidth can affect wireless networks deployed over a geographical area, for example, when multiple client devices are in use, the network is spread thin and the access speed slows down.

DETAILED DESCRIPTION

Embodiments of the present disclosure will be described more thoroughly from now on with reference to the accompanying drawings. Like numerals represent like elements throughout the several figures, and in which example embodiments are shown. However, embodiments of the claims can be embodied in many different forms and should not be construed as limited to the embodiments set forth herein. The examples set forth herein are non-limiting examples and are merely examples, among other possible examples. Throughout this specification, plural instances (e.g., "610") can implement components, operations, or structures (e.g., "610*a*") described as a single instance. Further, plural instances (e.g., "610") refer collectively to a set of components, operations, or structures (e.g., "610*a*") described as a single instance. The description of a single component (e.g., "610*a*") applies equally to a like-numbered component (e.g., "610*b*") unless indicated otherwise. These and other aspects, features, and implementations can be expressed as methods, apparatuses, systems, components, program products, means or steps for performing a function, and in other ways. These and other aspects, features, and implementations will become apparent from the following descriptions, including the claims.

The embodiments disclosed herein describe methods, apparatuses, and systems for deploying wireless connectivity across a geographical area. In embodiments, an apparatus includes a modem communicatively coupled to an Internet service provider (ISP) uplink and configured to receive an Internet connection from the ISP uplink using a first Internet uplink Ethernet cable. A router is communicatively coupled to the modem and configured to receive the Internet connection from the modem using a second Internet uplink Ethernet cable. A Power over Ethernet (PoE) switch is embedded within the apparatus and communicatively coupled to the router. The PoE switch is configured to receive the Internet connection from the router using a third Internet uplink Ethernet cable. A first one or more wireless backhaul bridges are embedded within the apparatus and communicatively coupled to the PoE switch. The one or more wireless backhaul bridges are configured to receive the Internet connection from the PoE switch using a set of PoE connections, and provide the Internet connection to a second one or more wireless backhaul bridges embedded within one or more other apparatuses external to the apparatuses. A wireless access point (AP) is embedded within the apparatus and communicatively coupled to the PoE switch. The wireless AP is configured to receive the Internet connection from the PoE switch. The wireless AP includes one or more Wi-Fi routers configured to provide the wireless connectivity, using the Internet connection, to one or more client devices.

In embodiments, a system for deploying wireless connectivity across a geographical area includes a first wireless node including a first one or more wireless backhaul bridges embedded within the first wireless node and configured to receive an Internet connection from an ISP uplink. The first wireless node includes a first wireless AP embedded within the first wireless node and configured to receive the Internet connection from the first one or more wireless backhaul bridges. The first wireless AP includes a first one or more Wi-Fi routers configured to provide the wireless connectivity, using the Internet connection, to a first one or more client devices. The system includes one or more second wireless nodes. Each of the one or more second wireless nodes includes a second one or more wireless backhaul bridges configured to wirelessly receive the Internet connection from the first one or more wireless backhaul bridges. Each of the one or more second wireless nodes includes a second wireless AP configured to receive the Internet connection from the second one or more wireless backhaul bridges. The second wireless AP includes a second one or more Wi-Fi routers configured to provide the wireless connectivity, using the Internet connection, to a second one or more client devices.

The advantages and benefits of the methods, systems, and apparatuses disclosed herein include broadening the range of a wireless network throughout a large geographical area such as a golf course, a stadium, a large residential property having a large backyard, a vineyard, etc. The wireless nodes disclosed strengthen the wireless signal of the router. The disclosed systems address the problem of reduced rattling speeds when a new user connects to the network. The disclosed apparatuses enable users to access the network regardless of their location inside the geographical area by providing multiple channels and frequencies. Further, the disclosed systems extend the reach of the Wi-Fi network across the area. The wireless signals are boosted for extended coverage. Moreover, the easy placement of the disclosed apparatuses effectively eliminates Wi-Fi dead zones to boost Internet speeds. The disclosed systems are budget friendly and work with traditional routers.

A geographical area having poor cellular coverage, such as properties blocked by mountains or far from cellular towers, would especially benefit from the embodiments disclosed herein. In addition, the embodiments are beneficial to users who desire better throughput or who would prefer to stay under their data cap. The advantages of the embodiments over underground Ethernet and Fiber are that the embodiments reduce the effort for implementation. There is less need to dig up meters of ground to install wires. Moreover, the directional aspect of the systems disclosed enable higher speeds and longer distances than omni-directional networking. In addition, the advantages of the convolutional neural network (CNN) used for machine learning (ML) in the disclosed embodiments include the obviation of feature extraction and the use of shared weight in convolutional layers, which means that the same filter (weights bank) is used for each node in the layer; this both reduces memory footprint and improves performance.

Figure 1:
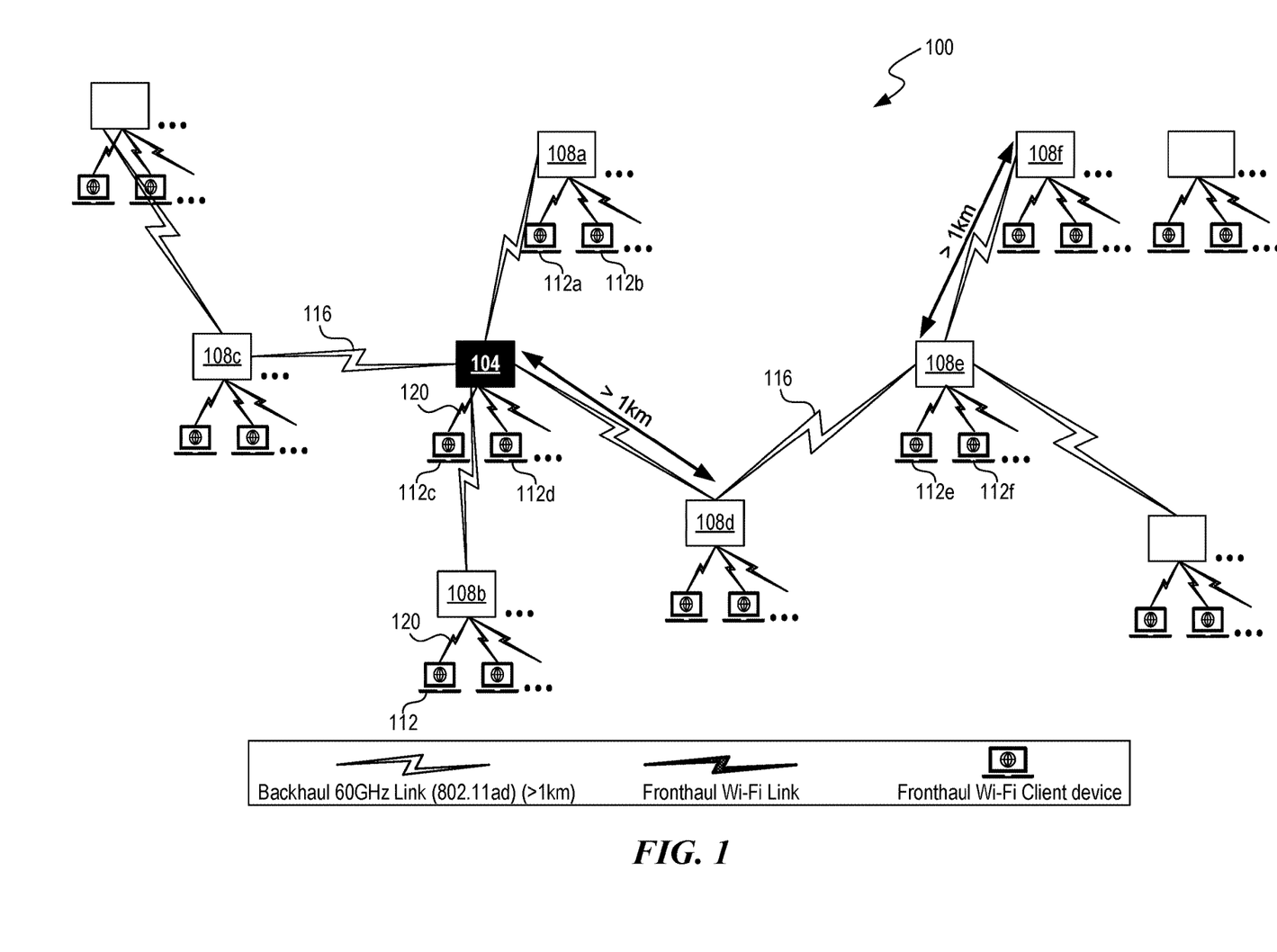
FIG. 1 is a drawing illustrating an example system for deploying wireless connectivity across a geographical area, in accordance with one or more embodiments.

FIG. 1 is a drawing illustrating an example system 100 for deploying wireless connectivity across a geographical area, in accordance with one or more embodiments. The geographical area is a golf course, a stadium, a large residential property having a large backyard, a vineyard, etc. The geographical area can cover between 1 square kilometer (km) and multiple square km. The geographical area is typically a large property having line-of-sight between devices 104, 108. The system 100 includes a principal wireless node 104 and multiple agent wireless nodes 108. The principal wireless node 104 (sometimes referred to as a first wireless node, primary node, principal node, master node, or manager node) is the same as or similar to the system 200 illustrated and described in more detail with reference to FIG. 2. Each agent wireless node 108 (sometimes referred to as a secondary node, second wireless node, slave node, or worker node) is the same as or similar to the apparatus 300 illustrated and described in more detail with reference to FIG. 3. The system 100 is implemented using the components of the example computer system 500 illustrated and described in more detail with reference to FIG. 5. Likewise, embodiments of the system 100 can include different and/or additional components or can be connected in different ways.

The system 100 includes the first wireless node 104. The first wireless node 104 can be implemented in a bollard, a bitt, a post, a lamppost, or a circuit box installed within the geographical area. The bollard is a relatively short and thick post made of wood, engineering plastic, or metal. In embodiments, the first wireless node 104 includes a PoE switch configured to receive an Internet connection from an ISP uplink. The PoE switch enables compatible devices (e.g., wireless backhaul bridges, access points (APs)) to work in places where power outlets or network connections don't exist. The PoE switch reduces the costs of installing electrical and network wiring while enabling edge devices to work where they are needed. An example PoE switch 240 is illustrated and described in more detail with reference to FIG. 2. The ISP uplink can be a wired or wireless connection from the local area network (LAN) to a wide area network (WAN), e.g., the Internet. In embodiments, the PoE switch is configured to receive the Internet connection from the ISP uplink via a modem and a router using Internet uplink Ethernet cables. An example modem 224, router 228, and Internet uplink Ethernet cables 248 are illustrated and described in more detail with reference to FIG. 2.

In embodiments, the first wireless node 104 includes a first one or more wireless backhaul bridges embedded within the first wireless node 104. The first one or more wireless backhaul bridges transport data between the Internet and subnetworks or wireless nodes 104, 108. The first wireless node 104 is upstream to the agent wireless nodes 108a, 108b, 108c, 108d. The agent wireless node 108d is upstream to the agent wireless node 108e. The agent wireless node 108e is upstream to the agent wireless node 108f. The agent wireless node 108f is downstream to the agent wireless node 108e. The agent wireless node 108e is downstream to the agent wireless node 108d. The agent wireless node 108d is downstream to the principal wireless node 104. FIG. 1 illustrates a Wi-Fi system that, instead of using traditional physical lines or omni-directional wireless backhaul, uses directional wireless devices 104, 108 to form backhauls between two locations, e.g., devices 104 and 108a, or agent wireless nodes 108d and 108e.

In embodiments, the first one or more wireless backhaul bridges create microwave communication between wireless nodes 104, 108. Example wireless backhaul bridges 244 are illustrated and described in more detail with reference to FIG. 2. The first one or more wireless backhaul bridges are configured to receive the Internet connection from the PoE switch. In embodiments, the first wireless node 104 includes a first wireless AP configured to receive the Internet connection from the PoE switch. The first one or more wireless backhaul bridges are configured to receive an Internet connection from the ISP uplink. An example ISP uplink 220 is illustrated and described in more detail with reference to FIG. 2.

In embodiments, the first wireless node 104 includes a first wireless AP embedded within the first wireless node 104. The first wireless AP is a networking hardware device that allows other Wi-Fi devices (e.g., one or more client devices 112) to connect to the Internet or network. An example first wireless AP 236 is illustrated and described in more detail with reference to FIG. 2. The first wireless AP is configured to receive the Internet connection from the first one or more wireless backhaul bridges.

The first wireless AP includes one or more Wi-Fi routers configured to provide the wireless connectivity, using the Internet connection, to a first one or more client devices 112c, 112d. For example, the first wireless AP can include one two, or three Wi-Fi routers configured to provide the wireless connectivity, using the Internet connection, to client devices 112c, 112d. The first wireless AP uses fronthaul Wi-Fi links 120 to provide the wireless connectivity, using the Internet connection, to client devices 112c, 112d. The client devices 112 shown in FIG. 1 are any of smartphones, tablets, FitBits™, smartwatches, laptops, desktops, fitness trackers, wireless headsets, etc.

In embodiments, the first wireless AP is configured to receive the Internet connection from the PoE switch using a PoE connection. An example PoE connection 260 is illustrated and described in more detail with reference to FIG. 2. The PoE switch is configured to power the AP using the PoE connection. The PoE switch is configured to power the first one or more wireless backhaul bridges using a set of PoE connections. An example set of PoE connections 256 are illustrated and described in more detail with reference to FIG. 2.

In embodiments, the system 100 includes one or more second wireless nodes 108a, 108b, 108c, 108d. Each of the one or more second wireless nodes (e.g., the second wireless node 108a) includes a second one or more wireless backhaul bridges configured to wirelessly receive the Internet connection from the first wireless node 104 (via the first one or more wireless backhaul bridges). The one or more second wireless nodes 108a, 108b, 108c, 108d are downstream from the first wireless node 104. For example, the second wireless node 108a wirelessly receives the Internet connection from the first (principal) wireless node 104 using a 60 Gigahertz (GHz) wireless backhaul link 116. In embodiments, the 60 GHz wireless backhaul link 116 operates in accordance with the IEEE 802.11 standard. In embodiments, the 60 GHz wireless backhaul link 116 operates in accordance with the IEEE 802.11ad/ay standard.

In embodiments, the system 100 uses a 60 Gigahertz (GHz) wireless backhaul link 116. In embodiments, the one or more wireless backhaul bridges are non-standard industrial, scientific and medical (ISM)-band backhaul devices operating in a 900 Megahertz (MHz) band. In embodiments, the one or more wireless backhaul bridges are non-standard ISM-band backhaul devices operating in a 24 GHz band (link 116). In embodiments, the one or more wireless backhaul bridges are non-standard ISM-band backhaul devices operating in a 122 GHz band (link 116). In embodiments, the one or more wireless backhaul bridges are non-standard ISM-band backhaul devices operating in a 244 GHz band (link 116).

One or more wireless backhaul bridges in the wireless node 104 connect to other one or more wireless backhaul bridges in the wireless nodes 108a, 108b using the wireless backhaul link 116. In embodiments, the wireless backhaul link 116 has a 1 Gigabit (Gb) throughput. The system 100 is configured to prevent interference between the backhaul link 116 and the Wi-Fi fronthaul connectivity. Wi-Fi interference can occur a signal outside of the configured Wi-Fi network that impairs normal operation of the Wi-Fi network. Because the backhaul link 116 operates at 900 MHz or above 60 Ghz, the system 100 prevents interference with the Wi-Fi connectivity. The wireless backhaul bridges and the second one or more wireless backhaul bridges are configured to prevent interference with the Wi-Fi connectivity because the wireless backhaul bridges use the link 116. The system 100 includes a power module embedded within the first wireless node 104 and configured to draw electrical power from an external power source by a power line. Example power lines are illustrated and described in more detail with reference to FIGS. 2 and 3. In embodiments, the electrical power is 110 volt (V) alternating current (AC) power. For example, the external power source is a controller of a streetlight located proximate to the first wireless node 104 and within the geographical area. The wireless nodes 104, 108 can be powered by existing electrical power infrastructure (water sprinklers, streetlights, etc.) installed in the geographical area.

In embodiments, each of the one or more second wireless nodes (e.g., the second wireless node 108a) includes a second wireless AP configured to receive the Internet connection from the second one or more wireless backhaul bridges. An example second wireless AP 336 is illustrated and described in more detail with reference to FIG. 3. The second wireless AP includes a second one or more Wi-Fi routers configured to provide the wireless connectivity, using the Internet connection, to a second one or more client devices, e.g., 112a, 112b. For example, the second wireless AP includes one, two, or three Wi-Fi routers configured to provide the wireless connectivity, using the Internet connection, to client devices 112a, 112b.

In embodiments, a spacing between the first wireless node 104 and a second wireless node 108d of the one or more second wireless nodes 108 is larger than a threshold spacing. The threshold spacing is around 1 km. For example, the threshold spacing can be 0.9 km, 1 km, 1.1 km, etc. In embodiments, a spacing between a second wireless node 108a of the one or more second wireless nodes 108 and another second wireless node 108b of the one or more second wireless nodes 108 is larger than the threshold spacing.

In embodiments, the system 100 includes one or more third wireless nodes 108e, 108f. Each of the one or more third wireless nodes 108e, 108f is the same as or similar to the one or more second wireless nodes 108. Each of the one or more third wireless nodes 108e, 108f is the same as or similar to the apparatus 300 illustrated and described in more detail with reference to FIG. 3. The third wireless nodes 108e, 108f are downstream from the second wireless nodes (e.g., wireless node 108d). Each of the one or more third wireless nodes (e.g., wireless nod 108e) includes a third one or more wireless backhaul bridges configured to wirelessly receive the Internet connection from the second one or more wireless backhaul bridges. Each of the third one or more wireless backhaul bridges is the same as or similar to the wireless backhaul bridges 344 illustrated and described in more detail with reference to FIG. 3. Each of the one or more third wireless nodes (e.g., wireless nod 108e) includes a third wireless AP configured to receive the Internet connection from the third one or more wireless backhaul bridges. The third wireless AP is the same as or similar to the wireless AP 336 illustrated and described in more detail with reference to FIG. 3. In embodiments, the third wireless AP includes a third one or more Wi-Fi routers configured to provide the wireless connectivity, using the Internet connection, to a third one or more client devices 112e, 112f. For example, the third wireless AP includes one, two, or three Wi-Fi routers configured to provide the wireless connectivity, using the Internet connection, to client devices 112e, 112f.

In embodiments, a spacing between a second wireless node 108d of the one or more second wireless nodes and a third wireless node 108e of the one or more third wireless nodes is larger than the threshold spacing. In embodiments, a spacing between a third wireless node 108e of the one or more third wireless nodes and another third wireless node 108f of the one or more third wireless nodes is larger than the threshold spacing. In embodiments, each of the first wireless node 104 and the one or more second wireless nodes 108 is located within a respective bollard, a respective bitt, a respective post, a respective lamppost, or a respective circuit box installed within the geographical area.

Figure 2:
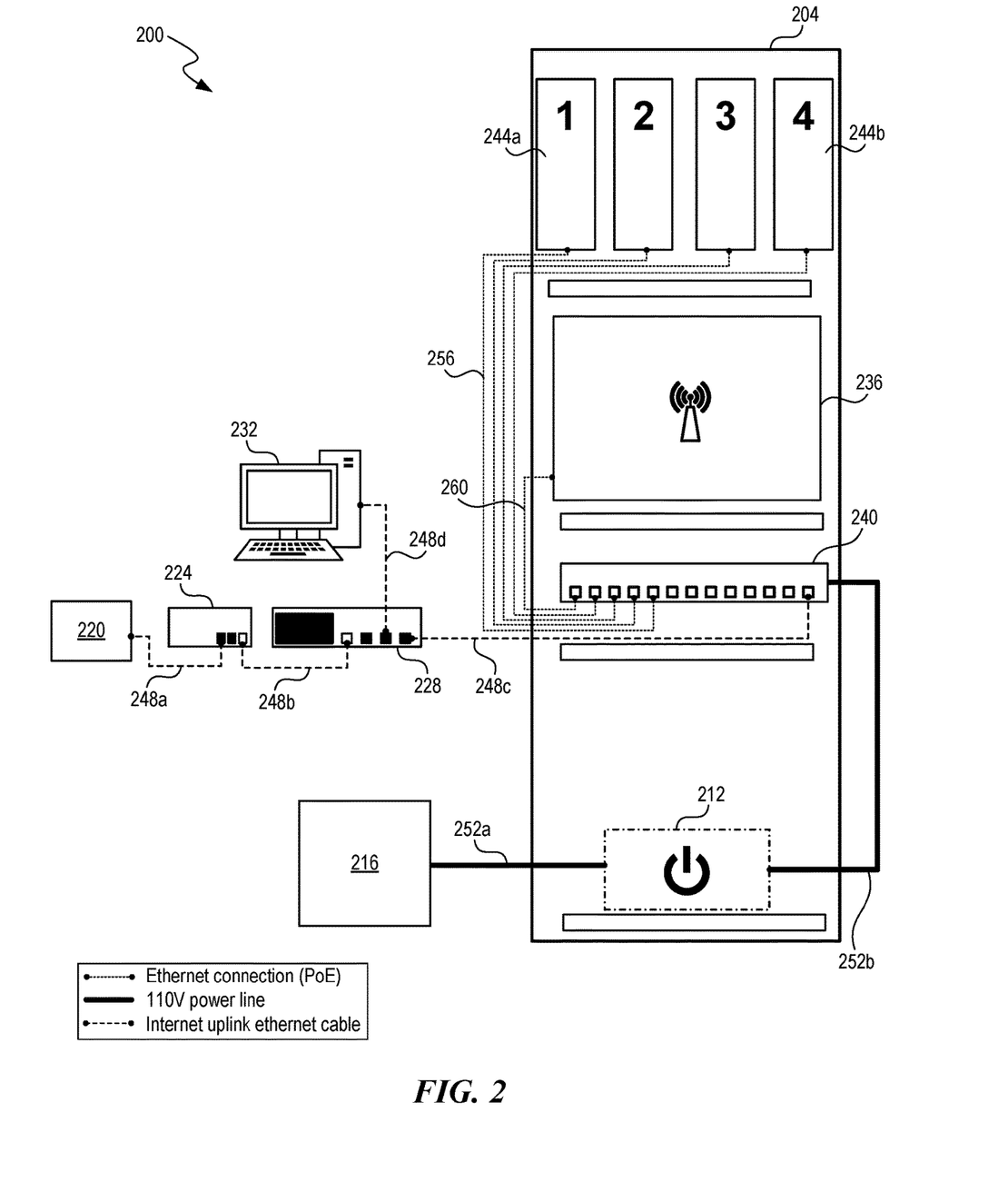
FIG. 2 is a drawing illustrating an example apparatus for deploying wireless connectivity across a geographical area, in accordance with one or more embodiments.

FIG. 2 is a drawing illustrating an example system 200 for deploying wireless connectivity across a geographical area, in accordance with one or more embodiments. The system 200 includes a modem 224, an ISP uplink 220, a device 204, and other components. The device 204 includes a wireless AP 236 communicatively coupled to a PoE switch 240. The system 200 can be used to implement the principal wireless node 104 illustrated and described in more detail with reference to FIG. 1. The system 200 is implemented using the components of the example computer system 500 illustrated and described in more detail with reference to FIG. 5. Likewise, embodiments of the system 200 can include different and/or additional components or can be connected in different ways.

In embodiments, the system 200 is implemented as a bollard for deploying wireless connectivity across a geographical area. The system 200 includes a modem 224 communicatively coupled to the ISP uplink 220 and configured to receive an Internet connection from the ISP uplink 220 using a first Internet uplink Ethernet cable 248a. The modem 224 (modulator-demodulator) is a computer hardware device that converts data from a digital format into a format suitable for an analog transmission medium such as telephone or radio. The first Internet uplink Ethernet cable 248a is an Ethernet cable, for example, a cable used by Ethernet hubs, switches, and routers for an uplink connection.

The system 200 includes a router 228 communicatively coupled to the modem 224 and configured to receive the Internet connection from the modem 224 using a second Internet uplink Ethernet cable 248b. The router 228 is a networking device that forwards data packets between computer networks. Routers perform the traffic directing functions on the Internet. Data sent through the internet, such as a web page or email, is in the form of data packets. The system 200 includes a PoE switch 240 embedded within the bollard and communicatively coupled to the router 228. The PoE switch 240 is configured to receive the Internet connection from the router 228 using a third Internet uplink Ethernet cable 248c. The second and third Internet uplink Ethernet cables 248b and 248c are the same as or similar to the first Internet uplink Ethernet cable 248a. In embodiments, the system 200 includes a computer device 232 communicatively coupled to the router 228 and configured to update software or firmware of the bollard using a fourth Internet uplink Ethernet cable 248d.

The system 200 includes one or more wireless backhaul bridges 244a, 244b embedded within the bollard and communicatively coupled to the PoE switch 240. The one or more wireless backhaul bridges 244 are configured to receive the Internet connection from the PoE switch 240 using a set of PoE connections 256. The one or more wireless backhaul bridges 244 are configured to provide the Internet connection to a second one or more wireless backhaul bridges 344 embedded within one or more other bollards external to the bollard. The wireless backhaul bridges 344 are illustrated and described in more detail with reference to FIG. 3. In embodiments, the first one or more wireless backhaul bridges 244 are configured to provide the Internet connection to the second one or more wireless backhaul bridges 344 using one or more 60 GHz wireless backhaul links 116. The wireless backhaul links 116 are illustrated and described in more detail with reference to FIG. 1.

The system 200 includes a wireless AP 236 embedded within the bollard and communicatively coupled to the PoE switch 240. The wireless AP 236 is configured to receive the Internet connection from the PoE switch 240. The wireless AP 236 includes one or more Wi-Fi routers configured to provide the wireless connectivity, using the Internet connection, to one or more of the client devices 112. For example, the wireless AP 236 includes a first Wi-Fi router configured to provide the wireless connectivity, using the Internet connection, to one or more of the client devices 112. Example client devices 112 are illustrated and described in more detail with reference to FIG. 1. In embodiments, the first Wi-Fi router is a 2.4 GHz router. The one or more client devices are located within the geographical area. Continuing the example, the wireless AP 236 includes a second Wi-Fi router configured to provide the wireless connectivity, using the Internet connection, to a second one or more of the client devices 112. In embodiments, the second Wi-Fi router is a 5 GHz router. The second one or more client devices are located within the geographical area.

Continuing the example, the wireless AP 236 includes a third Wi-Fi router configured to provide the wireless connectivity, using the Internet connection, to a third one or more of the client devices 112. In embodiments, the third Wi-Fi router is a 6 GHz router. The third one or more client devices are located within the geographical area. The 6 GHz band is newly certified and is exclusive to devices that support Wi-Fi 6E. On 6 GHz, the Wi-Fi network can accommodate legacy devices. The 6 GHz band also supports almost twice as many channels as 5 GHz. Fewer devices, more spectrum, and more bandwidth means less interference and network congestion. In embodiments, a Wi-Fi router in the wireless AP 236 can operates on one or more of the 2.4 GHz, 5 GHz, or 6 GHz bands. The wireless AP 236 uses fronthaul Wi-Fi links 120 to provide the wireless connectivity, using the Internet connection, to the client devices 112. The fronthaul Wi-Fi links 120 are illustrated and described in more detail with reference to FIG. 1.

In embodiments, the bollard includes a power module 212 (sometimes referred to as a power pack or power supply) embedded within the bollard. The power module 212 (sometimes referred to as a power supply unit (PSU)) converts mains alternating current (AC) power to lower-voltage regulated direct current (DC) power for the internal components of the bollard. In embodiments, the power module 212 uses switched-mode power supplies. The power module 212 is configured to draw electrical power from an external power source 216 by a first power line 252a.

The external power source 216 supplies energy to the power module 212 in the form of electrical power. The external power source 216 can be an electrical outlet, an energy storage device, such as a battery or a fuel cell, a generator or alternator, a solar power converter, or another power supply, for example, in another bollard. In embodiments, the electrical power is 110 volt (V) AC power. For example, the external power source 216 can be a controller of a water sprinkler or another apparatus located proximate to the bollard and within the geographical area. In embodiments, the PoE switch 240 is electrically coupled to the power module 212 and configured to draw the electrical power from the power module 212 using a second power line 252b. The second power line 252b is the same as or similar to the first power line 252a.

In embodiments, the first and second power lines 252 are 110 V AC power lines. In embodiments, the wireless AP 236 is configured to receive the Internet connection from the PoE switch 240 using a PoE connection 260. The PoE connection 260 passes electric power over twisted-pair Ethernet cable to powered devices, such as wireless APs, IP cameras, and VoIP phones in addition to the data that the PoE connection 260 carries. The PoE switch 240 is configured to power the wireless AP 236 using the PoE connection 260 as well as to power the first one or more wireless backhaul bridges 244 using a set of PoE connections 256. Each cable in the set of PoE connections 256 is the same as or similar to the PoE connection 260.

Figure 3:
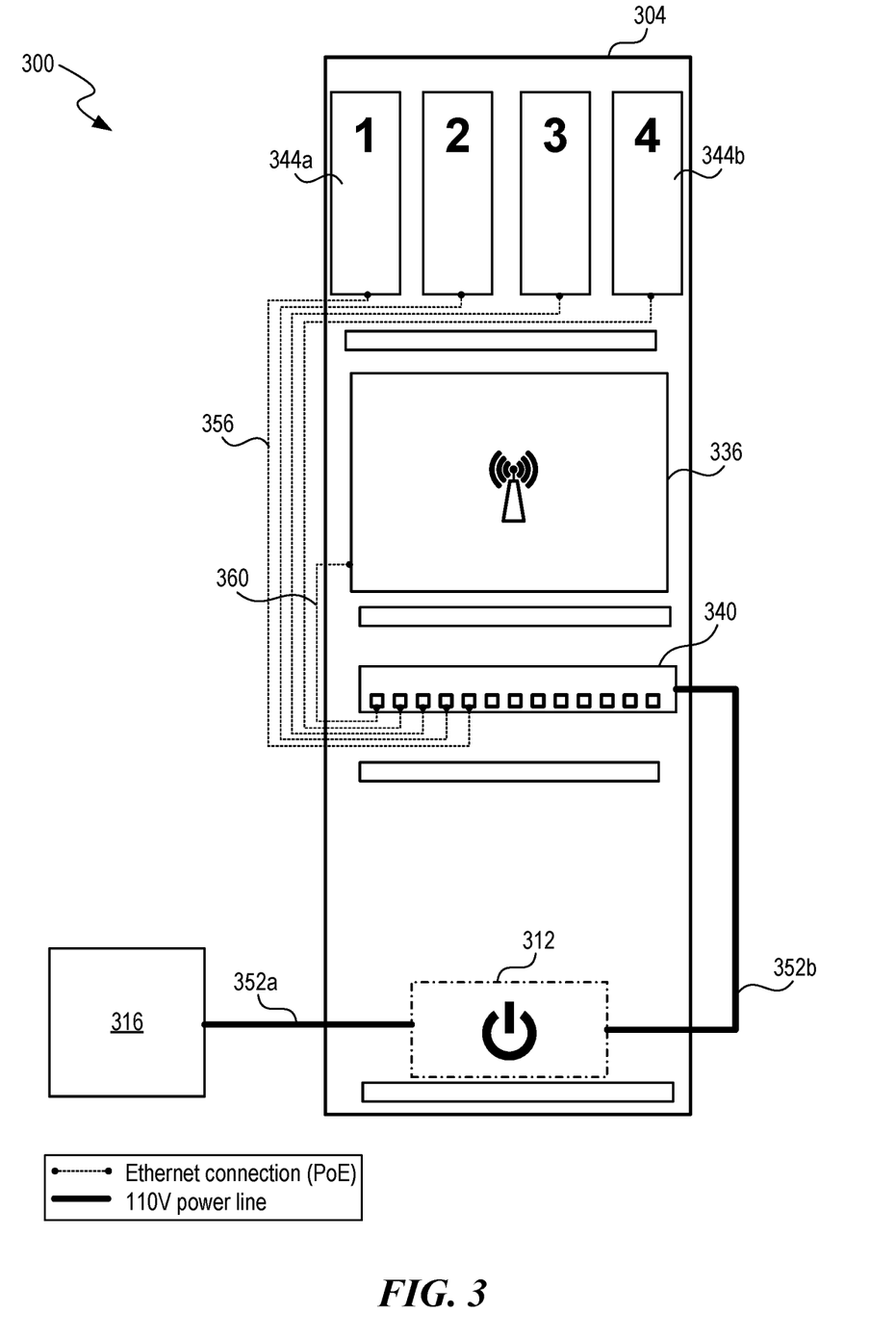
FIG. 3 is a drawing illustrating an example apparatus for deploying wireless connectivity across a geographical area, in accordance with one or more embodiments.

FIG. 3 is a drawing illustrating an example apparatus 300 for deploying wireless connectivity across a geographical area, in accordance with one or more embodiments. The apparatus 300 includes a PoE switch 340, one or more wireless backhaul bridges 344a, 344b, and a wireless AP 336. The apparatus 300 is implemented using the components of the example computer system 500 illustrated and described in more detail with reference to FIG. 5. Likewise, embodiments of the apparatus 300 can include different and/or additional components or can be connected in different ways.

In embodiments, the apparatus 300 is implemented as a bollard for deploying wireless connectivity across a geographical area. The apparatus 300 includes the PoE switch 340 embedded within the bollard and communicatively coupled to the wireless backhaul bridges 344. The PoE switch 340 is configured to receive the Internet connection from the wireless backhaul bridges 344 using a set of PoE connections 356. The set of PoE connections 356 is the same as or similar to the set of PoE connections 256 illustrated and described in more detail with reference to FIG. 2. The apparatus 300 includes the one or more wireless backhaul bridges 344 embedded within the bollard and communicatively coupled to the PoE switch 340. The one or more wireless backhaul bridges 344 are configured to receive the Internet connection from wireless backhaul bridges of upstream bollards (e.g., the wireless backhaul bridges 244 illustrated and described in more detail with reference to FIG. 2). The wireless backhaul bridges 344 provide the Internet connection to other one or more downstream wireless backhaul bridges embedded within one or more other downstream bollards external to the bollard. In embodiments, the one or more wireless backhaul bridges 344 are configured to provide the Internet connection to other downstream one or more wireless backhaul bridges (belonging to downstream agent wireless nodes, e.g., wireless node 108f) using one or more 60 GHz wireless backhaul links 116. The wireless backhaul links 116 are illustrated and described in more detail with reference to FIG. 1.

The apparatus 300 includes the wireless AP 336 embedded within the bollard and communicatively coupled to the PoE switch 340. The wireless AP 336 is configured to receive the Internet connection from the PoE switch 340 using a PoE connection 360. The PoE connection 360 is the same as or similar to the PoE connection 260 illustrated and described in more detail with reference to FIG. 2. In embodiments, the PoE switch 340 is configured to power the AP 336 using the PoE connection 360. In embodiments, the PoE switch 340 is configured to power the one or more wireless backhaul bridges 344 using the set of PoE connections 356. The set of PoE connections 356 is the same as or similar to the set of PoE connections 256 illustrated and described in more detail with reference to FIG. 2. The wireless AP 336 is configured to receive the Internet connection from the PoE switch 340.

The wireless AP 336 includes a first one or more Wi-Fi routers configured to provide the wireless connectivity, using the Internet connection, to a first one or more of the client devices 112. For example, the wireless AP 336 includes a first Wi-Fi router configured to provide the wireless connectivity, using the Internet connection, to a first one or more client devices. Example client devices 112 are illustrated and described in more detail with reference to FIG. 1. In embodiments, the first Wi-Fi router is a 2.4 GHz router. The first one or more client devices are located within the geographical area. Continuing the example, the wireless AP 336 includes a second Wi-Fi router configured to provide the wireless connectivity, using the Internet connection, to a second one or more client devices. In embodiments, the second Wi-Fi router is a 5 GHz router. The second one or more client devices are located within the geographical area.

Continuing the example, the wireless AP 336 includes a third Wi-Fi router configured to provide the wireless connectivity, using the Internet connection, to a third one or more client devices. In embodiments, the second Wi-Fi router is a 6 GHz router. The second one or more client devices are located within the geographical area. In embodiments, a router of the wireless AP 336 can operate on one or more than one of the 2.4 GHz, 5 GHz, or 6 GHz Wi-Fi bands. The wireless AP 336 uses fronthaul Wi-Fi links 120 to provide the wireless connectivity, using the Internet connection, to the client devices 112. The fronthaul Wi-Fi links 120 are illustrated and described in more detail with reference to FIG. 1.

In embodiments, the bollard includes a power module 312 embedded within the bollard and configured to draw electrical power from an external power source 316 by a first power line 352a. The power module 312 is the same as or similar to the power module 212 illustrated and described in more detail with reference to FIG. 2. The external power source 316 is the same as or similar to the external power source 216 illustrated and described in more detail with reference to FIG. 2. The first power line 352a is the same as or similar to the first power line 252a illustrated and described in more detail with reference to FIG. 2. In embodiments, the electrical power is 110 V AC power. In embodiments, the external power source 316 is a controller of a water sprinkler located proximate to the bollard and within the geographical area. In embodiments, the PoE switch 340 is electrically coupled to the power module 312 and configured to draw the electrical power from the power module 312 using a second power line 352b. The second power line 352b is the same as or similar to the second power line 252b illustrated and described in more detail with reference to FIG. 2. In embodiments, the first and second power lines 352 are 110 V AC power lines.

In embodiments, the bollard includes a computer device communicatively coupled to components of the bollard and configured to update software or firmware of the bollard. The computer device is the same as or similar to the computer device 232 illustrated and described in more detail with reference to FIG. 2.

Figure 4:
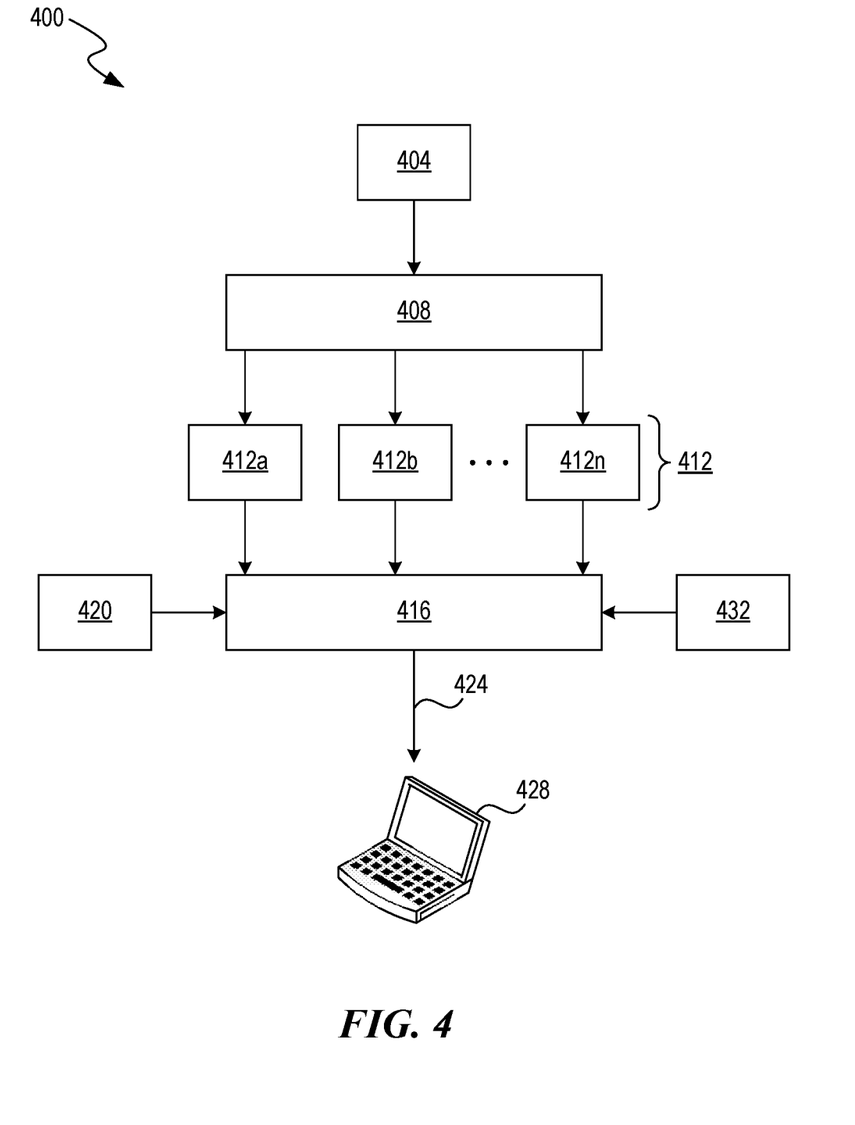
FIG. 4 is a block diagram illustrating an example machine learning (ML) system, in accordance with one or more embodiments.

FIG. 4 is a block diagram illustrating an example ML system 400, in accordance with one or more embodiments. The ML system 400 is implemented using components of the example computer system 500 illustrated and described in more detail with reference to FIG. 5. For example, the ML system 400 can be implemented on the console 108 using instructions programmed in the memory 164 illustrated and described in more detail with reference to FIG. 1. Likewise, embodiments of the ML system 400 can include different and/or additional components or be connected in different ways. The ML system 400 is sometimes referred to as a ML module.

The ML system 400 includes a feature extraction module 408 implemented using components of the example computer system 500 illustrated and described in more detail with reference to FIG. 5. In some embodiments, the feature extraction module 408 extracts a feature vector 412 from input data 404. The feature vector 412 includes features 412a, 412b, . . . 412n. The feature extraction module 408 reduces the redundancy in the input data 404, e.g., repetitive data values, to transform the input data 404 into the reduced set of features 412, e.g., features 412a, 412b, . . . 412n. The feature vector 412 contains the relevant information from the input data 404, such that events or data value thresholds of interest can be identified by the ML model 416 by using this reduced representation. In some example embodiments, the following dimensionality reduction techniques are used by the feature extraction module 408: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

In alternate embodiments, the ML model 416 performs deep learning (also known as deep structured learning or hierarchical learning) directly on the input data 404 to learn data representations, as opposed to using task-specific algorithms. In deep learning, no explicit feature extraction is performed; the features 412 are implicitly extracted by the ML system 400. For example, the ML model 416 can use a cascade of multiple layers of nonlinear processing units for implicit feature extraction and transformation. Each successive layer uses the output from the previous layer as input. The ML model 416 can thus learn in supervised (e.g., classification) and/or unsupervised (e.g., pattern analysis) modes. The ML model 416 can learn multiple levels of representations that correspond to different levels of abstraction, wherein the different levels form a hierarchy of concepts. In this manner, the ML model 416 can be configured to differentiate features of interest from background features.

In alternative example embodiments, the ML model 416, e.g., in the form of a CNN generates the output 424, without the need for feature extraction, directly from the input data 404. The output 424 is provided to the computer device 428 or the computer device 232 illustrated and described in more detail with reference to FIG. 2. Each of the computer devices 428, 232 can be a server, laptop, desktop, computer, tablet, smartphone, smart speaker, etc., implemented using components of the example computer system 500 illustrated and described in more detail with reference to FIG. 5. In some embodiments, the steps performed by the ML system 400 are stored in memory on the computer device 428 for execution. In other embodiments, the output 424 is displayed on the computer device 232 illustrated and described in more detail with reference to FIG. 2.

A CNN is a type of feed-forward artificial neural network in which the connectivity pattern between its neurons is inspired by the organization of a visual cortex. Individual cortical neurons respond to stimuli in a restricted area of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing.

The ML model 416 can be a CNN that includes both convolutional layers and max pooling layers. The architecture of the ML model 416 can be "fully convolutional," which means that variable sized sensor data vectors can be fed into it. For all convolutional layers, the ML model 416 can specify a kernel size, a stride of the convolution, and an amount of zero padding applied to the input of that layer. For the pooling layers, the model 416 can specify the kernel size and stride of the pooling.

In some embodiments, the ML system 400 trains the ML model 416, based on the training data 420, to correlate the feature vector 412 to expected outputs in the training data 420. As part of the training of the ML model 416, the ML system 400 forms a training set of features and training labels by identifying a positive training set of features that have been determined to have a desired property in question, and, in some embodiments, forms a negative training set of features that lack the property in question.

The ML system 400 applies ML techniques to train the ML model 416, that when applied to the feature vector 412, outputs indications of whether the feature vector 412 has an associated desired property or properties, such as a probability that the feature vector 412 has a particular Boolean property, or an estimated value of a scalar property. The ML system 400 can further apply dimensionality reduction (e.g., via linear discriminant analysis (LDA), PCA, or the like) to reduce the amount of data in the feature vector 412 to a smaller, more representative set of data.

The ML system 400 can use supervised ML to train the ML model 416, with feature vectors of the positive training set and the negative training set serving as the inputs. In some embodiments, different ML techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, CNNs, etc., are used. In some example embodiments, a validation set 432 is formed of additional features, other than those in the training data 420, which have already been determined to have or to lack the property in question. The ML system 400 applies the trained ML model 416 to the features of the validation set 432 to quantify the accuracy of the ML model 416. Common metrics applied in accuracy measurement include: Precision and Recall, where Precision refers to a number of results the ML model 416 correctly predicted out of the total it predicted, and Recall is a number of results the ML model 416 correctly predicted out of the total number of features that had the desired property in question. In some embodiments, the ML system 400 iteratively re-trains the ML model 416 until the occurrence of a stopping condition, such as the accuracy measurement indication that the ML model 416 is sufficiently accurate, or a number of training rounds having taken place. The validation set 432 can be generated based on analysis to be performed.

Figure 5:
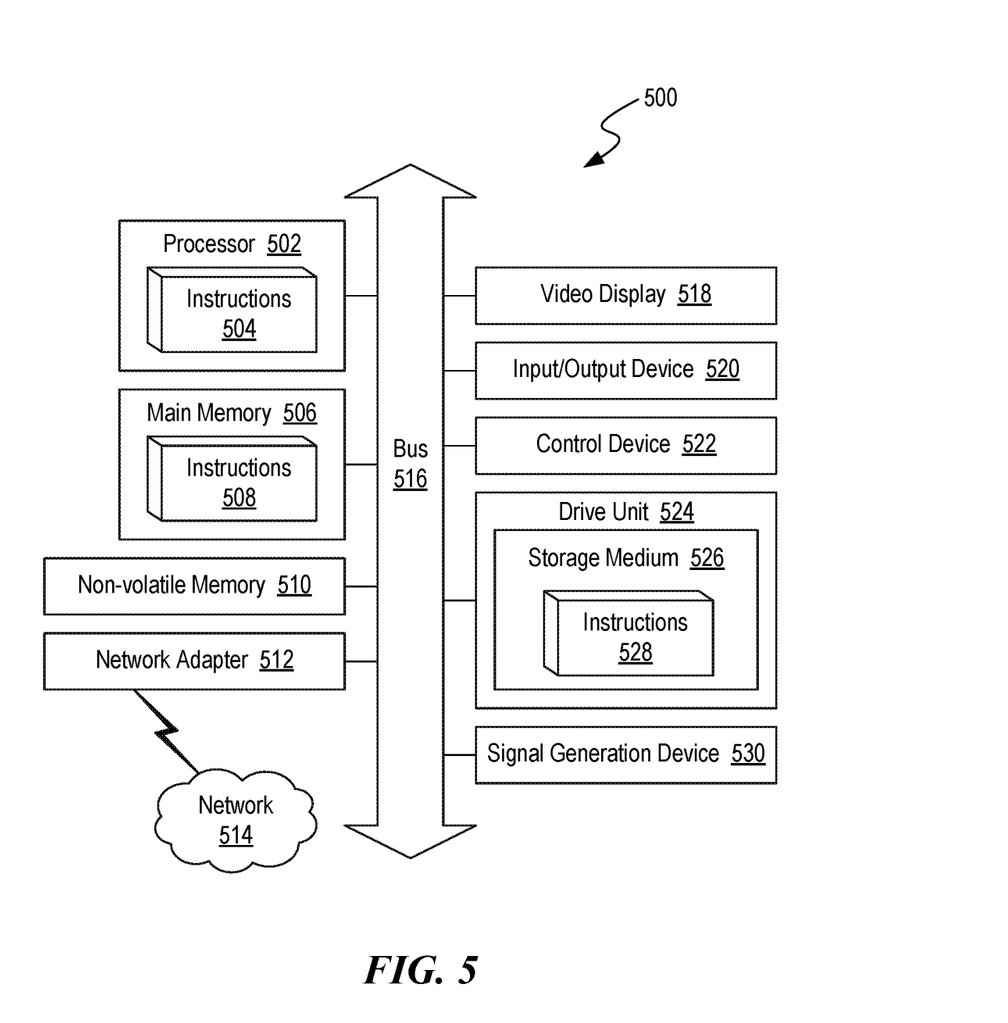
FIG. 5 is a block diagram illustrating an example computer system, in accordance with one or more embodiments.

FIG. 5 is a block diagram illustrating an example computer system 500, in accordance with one or more embodiments. Components of the example computer system 500 can be used to implement the system 100, the system 200, or the apparatus 300 illustrated and described in more detail with reference to FIGS. 1-3. In some embodiments, components of the example computer system 500 are used to implement the ML system 400 illustrated and described in more detail with reference to FIG. 4. At least some operations described herein can be implemented on the computer system 500.

The computer system 500 can include one or more central processing units ("processors") 502, main memory 506, non-volatile memory 510, network adapters 512 (e.g., network interface), video displays 518, input/output devices 520, control devices 522 (e.g., keyboard and pointing devices), drive units 524 including a storage medium 526, and a signal generation device 530 that are communicatively connected to a bus 516. The bus 516 is illustrated as an abstraction that represents one or more physical buses and/or point-to-point connections that are connected by appropriate bridges, adapters, or controllers. The bus 516, therefore, can include a system bus, a Peripheral Component Interconnect (PCI) bus or PC I-Express bus, a HyperTransport or industry standard architecture (ISA) bus, a small computer system interface (SCSI) bus, a universal serial bus (USB), IIC (12C) bus, or an Institute of Electrical and Electronics Engineers (IEEE) standard 1394 bus (also referred to as "FIRE-WIRE").

The computer system 500 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 500.

While the main memory 506, non-volatile memory 510, and storage medium 526 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 528. The term "machine-readable medium" and "storage medium" shall also be taken to include any medium that is capable of storing, encoding, or carrying a set of instructions for execution by the computer system 500.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 504, 508, 528) set at various times in various memory and storage devices in a computer device. When read and executed by the one or more processors 502, the instruction(s) cause the computer system 500 to perform operations to execute elements involving the various aspects of the disclosure.

Moreover, while embodiments have been described in the context of fully functioning computer devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 510, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 512 enables the computer system 500 to mediate data in a network 514 with an entity that is external to the computer system 500 through any communication protocol supported by the computer system 500 and the external entity. The network adapter 512 can include a network adapter card, a wireless network interface card, a router, an access point, a wireless router, a switch, a multilayer switch, a protocol converter, a gateway, a bridge, a bridge router, a hub, a digital media receiver, and/or a repeater.

The network adapter 512 can include a firewall that governs and/or manages permission to access proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall can additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

The description and drawings herein are illustrative and are not to be construed as limiting. Numerous specific details are described to provide a thorough understanding of the disclosure. However, in certain instances, well-known details are not described in order to avoid obscuring the description. Further, various modifications can be made without deviating from the scope of the embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms can be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms can on occasion be used interchangeably.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications can be implemented by those skilled in the art.

We claim:

1. A bollard for deploying wireless connectivity across a geographical area, comprising:
    a modem communicatively coupled to an Internet service provider (ISP) uplink and configured to receive an Internet connection from the ISP uplink using a first Internet uplink ETHERNET cable;
    a router communicatively coupled to the modem and configured to receive the Internet connection from the modem using a second Internet uplink ETHERNET cable;
    a Power over ETHERNET (POE) switch embedded within the bollard and communicatively coupled to the router, the POE switch configured to receive the Internet connection from the router using a third Internet uplink ETHERNET cable;
    a first one or more wireless backhaul bridges embedded within the bollard and communicatively coupled to the POE switch, the one or more wireless backhaul bridges configured to:
    receive the Internet connection from the POE switch using a set of PoE connections; and
    provide the Internet connection to a second one or more wireless backhaul bridges embedded within one or more other bollards external to the bollard; and a wireless access point (AP) embedded within the bollard and communicatively coupled to the POE switch, the wireless AP configured to receive the Internet connection from the POE switch, the wireless AP comprising:
one or more WI-FI routers configured to provide the wireless connectivity, using the Internet connection, to one or more client devices.

2. The bollard of claim 1, comprising: a power module embedded within the bollard and configured to draw electrical power from an external power source by a first power line.

3. The bollard of claim 2, wherein the electrical power is 110 volt (V) alternating current (AC) power, and wherein the external power source is a controller of a water sprinkler located proximate to the bollard and within the geographical area.

4. The bollard of claim 2, wherein the POE switch is electrically coupled to the power module and configured to draw the electrical power from the power module using a second power line.

5. The bollard of claim 4, wherein the first and second power lines are 110 V AC power lines.

6. The bollard of claim 1, wherein the wireless AP is configured to receive the Internet connection from the POE switch using a PoE connection, and wherein the POE switch is configured to: power the AP using the PoE connection; and power the first one or more wireless backhaul bridges using the set of PoE connections.

7. The bollard of claim 1, wherein the one or more WI-FI routers operate on at least one of a 2.4 Gigahertz (GHz) band, a 5 GHz band, or a 6 GHz band.

8. The bollard of claim 1, wherein the one or more client devices are located within the geographical area.

9. The bollard of claim 1, comprising: a computer device communicatively coupled to the router and configured to update software or firmware of the bollard using a fourth Internet uplink ETHERNET cable.

10. The bollard of claim 1, wherein the first one or more wireless backhaul bridges are configured to operate on one of a 60 GHz band, 900 MHz band, 24 GHz band, 122 GHz band, or 244 GHz band.

11. A method performed by a bollard for deploying wireless connectivity across a geographical area, the method comprising:
receiving, by a modem communicatively coupled to an Internet service provider (ISP) uplink, an Internet connection from the ISP uplink using a first Internet uplink ETHERNET cable;
receiving, by a router communicatively coupled to the modem, the Internet connection from the modem using a second Internet uplink ETHERNET cable;
receiving, by a Power over ETHERNET (POE) switch embedded within the bollard and communicatively coupled to the router, the Internet connection from the router using a third Internet uplink ETHERNET cable;
receiving, by a first one or more wireless backhaul bridges embedded within the bollard and communicatively coupled to the POE switch, the Internet connection from the POE switch using a set of PoE connections;
providing the Internet connection to a second one or more wireless backhaul bridges embedded within one or more other bollards external to the bollard;
receiving, by a wireless access point (AP) embedded within the bollard and communicatively coupled to the POE switch, the Internet connection from the POE switch; and
providing, by one or more WI-FI routers, the wireless connectivity, using the Internet connection, to one or more client devices.

12. The method of claim 11, comprising: drawing, by a power module embedded within the bollard, electrical power from an external power source using a first power line.

13. The method of claim 12, wherein the electrical power is 110 volt (V) alternating current (AC) power, and wherein the external power source is a controller of a water sprinkler located proximate to the bollard and within the geographical area.

14. The method of claim 12, wherein the POE switch is electrically coupled to the power module and configured to draw the electrical power from the power module using a second power line.

15. The method of claim 14, wherein the first and second power lines are 110 V AC power lines.

16. The method of claim 11, comprising: receiving, by the wireless AP, the Internet connection from the POE switch using a PoE connection; powering, by the POE switch, the AP using the PoE connection; and powering the first one or more wireless backhaul bridges using the set of PoE connections.

17. The method of claim 11, wherein the one or more WI-FI routers operate on at least one of a 2.4 Gigahertz (GHz) band, a 5 GHz band, or a 6 GHz band.

18. The method of claim 11, wherein the one or more client devices are located within the geographical area.

19. The method of claim 11, comprising: updating, by a computer device communicatively coupled to the router, software or firmware of the bollard using a fourth Internet uplink ETHERNET cable.

20. The method of claim 11, wherein the first one or more wireless backhaul bridges are configured to operate on one of a 60 GHz band, 900 MHz band, 24 GHz band, 122 GHz band, or 244 GHz band.

* * * * *